United States Patent
Campton et al.

[15] 3,681,993
[45] Aug. 8, 1972

[54] DISPOSABLE CLINICAL THERMOMETER

[72] Inventors: Joseph M. Campton, Torrance; Julius G. Hammerslag, Newport Beach, both of Calif.

[73] Assignee: Sensitron, Inc., Costa Mesa, Calif.

[22] Filed: April 30, 1970

[21] Appl. No.: 33,278

[52] U.S. Cl. ..........................73/362 AR, 338/28
[51] Int. Cl. ..........G01k 7/22, H01c 1/02, H01c 7/04
[58] Field of Search....................73/362 AR; 338/28

[56] References Cited

UNITED STATES PATENTS

| 3,485,102 | 12/1969 | Glick..................73/362 AR |
| 3,356,980 | 12/1967 | Roberts............73/362 AR X |
| 3,550,448 | 12/1970 | Ensign...................73/343 R |
| 3,221,555 | 12/1965 | Biber....................73/362 AR |
| 3,402,378 | 9/1968 | Catlin et al........73/362 AR X |

*Primary Examiner*—Louis R. Prince
*Assistant Examiner*—Frederick Shoon
*Attorney*—Fowler, Knobbe & Martens

[57] ABSTRACT

A disposable temperature sensing unit, suitable for use with a temperature indicating unit as a clinical thermometer, in which a thermistor is connected to the probe end of a unitarily formed strand and probe which includes electrical conductors with a plug connected to the conductors and to the free end of the strand at the other end of the unit, along with a process for making the temperature sensing unit and the electric plug, are disclosed.

17 Claims, 8 Drawing Figures

PATENTED AUG 8 1972 3,681,993

INVENTORS.
JOSEPH M. CAMPTON
JULIUS G. HAMMERSLAG
BY
FOWLER, KNOBBE
& MARTENS
ATTORNEYS.

INVENTORS.
JOSEPH M. CAMPTON
JULIUS G. HAMMERSLAG
BY
FOWLER, KNOBBE
& MARTENS
ATTORNEYS.

DISPOSABLE CLINICAL THERMOMETER

This invention relates to temperature testing and measurement and, more specifically, to the clinical measurement of temperature for determining the presence and degree of fever in a patient. This invention also relates to electrical connectors and to processes for manufacturing temperature sensing units and electrical connectors.

The measurement of temperature in hospitals, homes, doctors' offices and clinics is almost universally accomplished using the conventional glass fever thermometer introduced approximately a century ago. The glass fever thermometer has the advantages of being relatively accurate and of being subject to chemical sterilization without deterioration of the accuracy. There are several disadvantages associated with the handling and use of the glass clinical thermometer, however. Among these disadvantages are the relatively high cost of the thermometer which makes it necessary to use each thermometer repeatedly, it being economically prohibitive to dispose of the thermometer after each use. The thermometers are subject to breakage and therefore must be handled carefully. There is, in addition, a certain amount of hazard associated with the use of glass thermometer in that the glass thermometer is easily broken and the broken thermometer may result in accidental or unintentional injury to the patient. Glass thermometers cannot be sterilized effectively, since thorough sterilization requires autoclaving which will fracture the thermometer. Incomplete sterilization, of course, may result in transmission of disease-causing organisms from one patient to another. To avoid the problem of disease transmission among patients, many hospitals use the same thermometer repeatedly on a given patient but discard the thermometer or give it to the patient upon the patient's discharge from the hospital. This, of course, is effective to prevent the spread of disease among patients in a hospital but it is not economical and does not avoid the other disadvantages associated with the use of the conventional glass clinical thermometer.

Thermoelectric temperature sensing elements of several kinds are known and are commonly used throughout industry. These elements have, however, traditionally been either so expensive as to be prohibitive for use in clinical applications or have been insufficiently accurate to permit their wide use in the hospital or clinic.

One class of thermoelectric temperature sensing elements is known as the thermistor. The thermistor is an electrical resistive element which has a high temperature coefficient of resistivity; i.e., the resistance of the thermistor changes significantly with a small change in temperature. Thermistors which have a low mass and which reach temperature equilibrium rapidly have been manufactured for several years but have not found wide application in the clinical field, although clinical thermometers using thermistors are known.

One of the principal features of this invention resides in the use of an especially designed temperature sensing unit which uses a high precision, high accuracy thermistor as a temperature sensitive element. The temperature sensitive unit is so designed as to obtain maximum utilization of the advantages afforded by thermistor temperature measurement and to permit single usage and disposal.

Hospitals, doctors and clinics have now widely adopted the disposable hypodermic syringe, partly because of the convenience afforded by the disposable syringe and partly because of the advantages of the disposable syringe in preventing transmission of disease organisms from one patient to another. The principal reason for the wide utilization of the disposable syringe, however, results from the availability of inexpensive syringes which can be disposed of economically. Economically disposable thermometers are expected to enjoy the same popularity. Another principal feature of this invention resides in the development of a temperature sensing unit which is both highly accurate and precise and which can also be disposed of after each use economically.

As experienced product engineers are aware, the problems involved in reducing the cost of manufacture of an electrical unit by a factor of five or ten, or even more, are quite serious and present serious technical problems, as well as economic problems. In the present instance, these technical problems involve all phases of the design of the temperature sensing unit, the probe, the lead from the probe, the plug, the temperature sensitive element and the methods and means for making and assembling the overall temperature sensing unit. Among the more important features of this invention are the methods developed for the economical production of a disposable temperature sensing unit and the elements and assemblies designed to permit economical manufacture of such disposable units.

Two particularly severe economic and technical problems were faced in the design of an economically feasible disposable temperature sensing unit and the development of methods for manufacturing such a unit. These problems relate to the manufacture of the probe and lead or strand and to the design and formation of an economically and technically suitable electrical plug. The features of this invention which are of importance, therefore, include the methods for forming the probe and strand combination and for forming the plug as well as the resulting structures.

Other important features of the invention will be apparent from the specification which follows and from the drawings to which reference is now made.

FIG. 1 of the drawing illustrates the clinical thermometer of this invention including the disposable temperature sensing unit and the temperature indicating unit.

Figure 1:
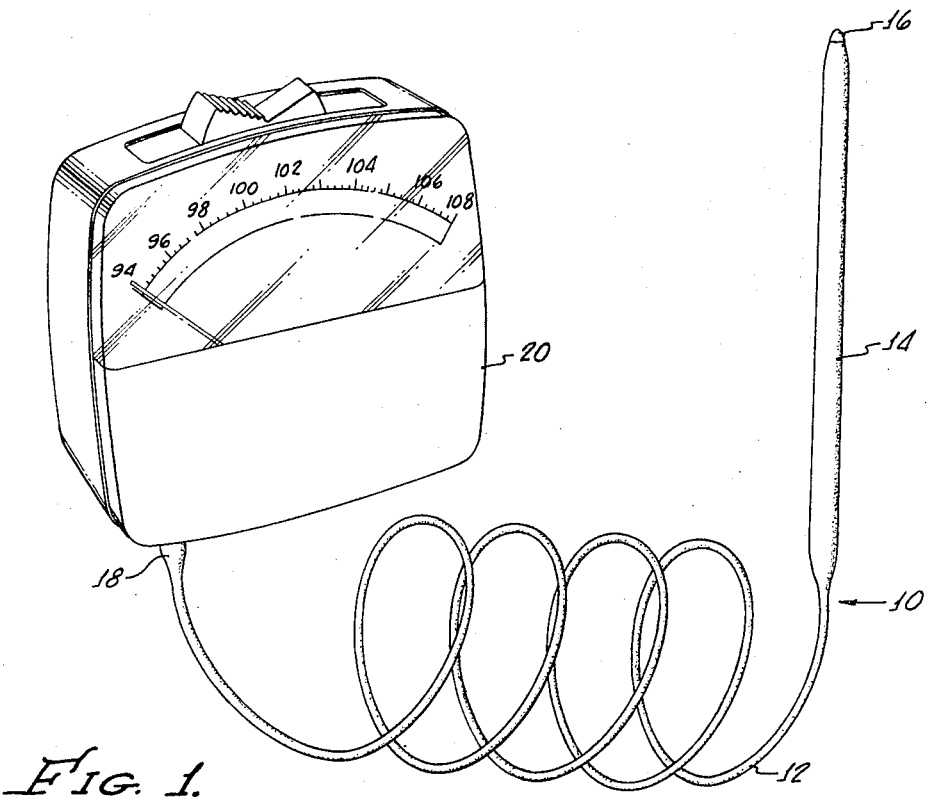
Figure 2:
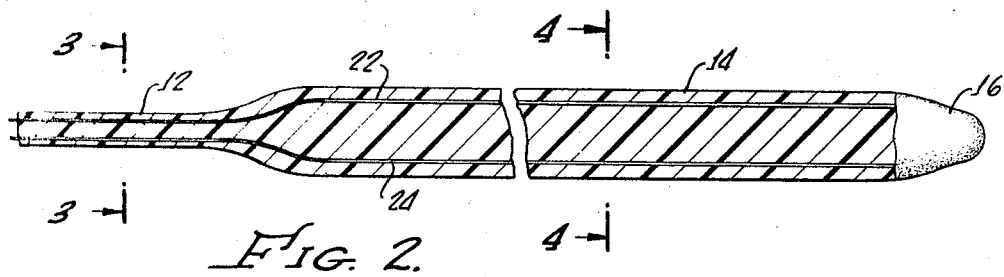
FIG. 2 is an enlarged view of the probe portion and part of the strand portion of the temperature sensing unit.
Figure 8:
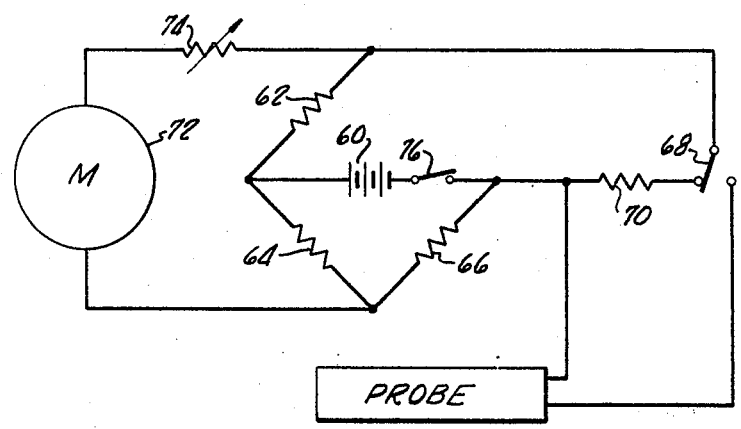
FIG. 8 is an exemplary electrical circuit for deriving a signal from the thermistor and giving a visual indication of the temperature of the thermistor, this circuit typically comprising a visual temperature indicating unit.

According to one feature, this invention comprises a complete clinical thermometer which, as illustrated in FIG. 1, comprises a temperature sensing unit 10 which includes a flexible strand 12 and a relatively more rigid probe 14 which is formed of a nontoxic, sterilizable material. A temperature sensitive member 16 and a plug 18 which comprises means for electrically connecting the conductors at the free end of the temperature sensitive unit strand to temperature indicating means 20 complete the thermometer. The temperature indicating unit may typically include electrical circuitry as illustrated in FIG. 8 and which will be discussed in greater detail hereinafter.

In the preferred embodiment, the strand 12 and the probe 14 are preferably unitarily formed from the same material by appropriate casting, molding, or by equivalent techniques, or by extrusion. The strand and probe include at least one conductor and, preferably, a plurality of conductors such as conductor pair 22 and 24. These conductors are maintained in spaced electrically nonshorting relationship with respect to each other and are encased in a sheath of insulating material.

At the free end of the probe 14, the conductors 22 and 24 are connected to the temperature sensitive element which, in the preferred form of the invention is a thermistor, shown at 26. The temperature sensitive element is then coated with and bonded to the end of the probe by a resinous or adhesive electrically insulative, heat conductive material shown at 28 thereby forming the temperature sensitive member 16.

Figure 6:
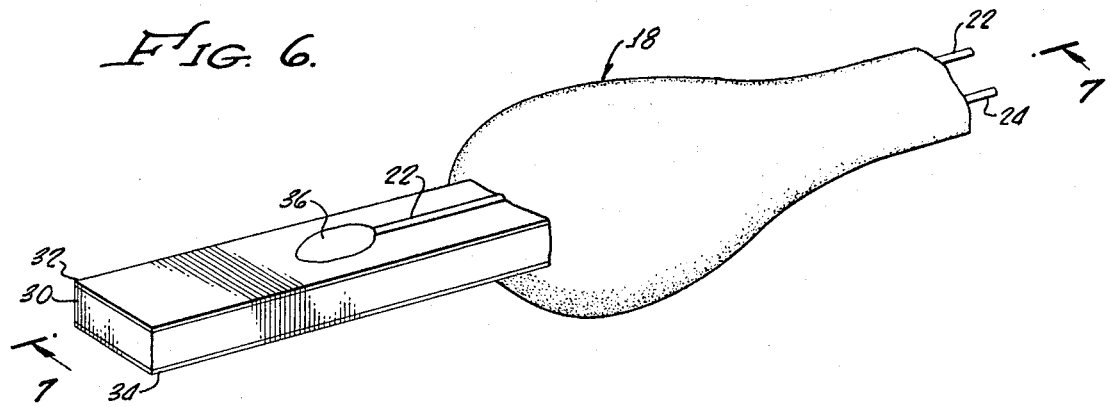
FIG. 6 is a perspective view of the plug secured to the free end of the strand of the temperature sensing unit.
Figure 7:
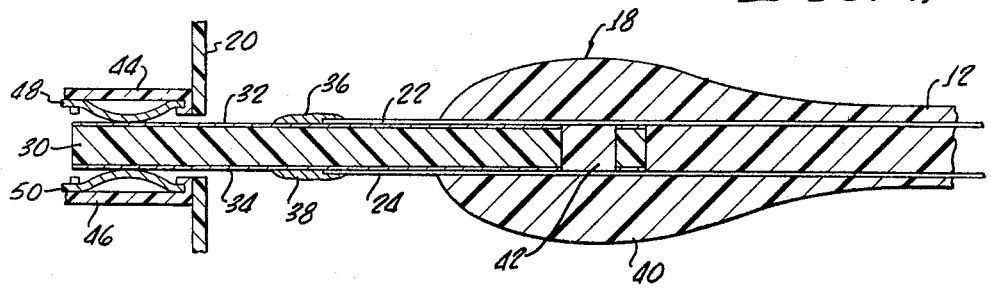
FIG. 7 is a longitudinal section of the plug illustrated in FIG. 6 taken substantial along lines 7—7 of FIG. 6.

Plug 18 may, of course, be of any commercially available style and construction, but it was discovered that all available plug constructions were undesirably or prohibitively expensive for use as part of a disposable temperature sensing unit. A technically improved and economically advantageous plug was, therefore, developed which is especially suited for use as part of the disposable temperature sensing unit. The plug 18 is illustrated in greater detail in FIGS. 6 and 7 to which reference is now made.

The plug of this invention comprises a thin, flat insulating board 30 with conductive foils 32 and 34 laminated or otherwise secured to the respective sides of the board. The plug is completed by securing electrical conductors 22 and 24 to the respective conductive foils, for example, by the use of solder connections 36 and 38. The strand 12 is desirably connected to the laminated board of the plug by a globule of insulating material of the same type used in the strand as shown at 40. A firm connection can be accomplished by providing an aperture 42 in the laminated board into which the insulating material of the glob 40 flows.

The laminated board portion of the plug 18 is received in a receptacle in the temperature indicating unit 20. The receptacle typically would include a pair of brackets 44 and 46 positioning resilient electrical contacts 48 and 50 for making electrical connection with the foils 32 and 34 on the laminated board. The receptacle, including contacts 48 and 50 and the plug 18 provides means for connecting the probe to the signal generating electrical circuitry in the temperature indicating unit.

There are a number of ways in which the temperature sensing unit 10, including the plug 18, can be manufactured. Not all manufacturing methods are equally effective, efficient and economical, however. It would be possible, for example, to manufacture a temperature sensing unit by securing the conductors to the laminated board at one end and to the thermistor at the other end and casting or molding a plastisol, thermoplastic or thermosetting resin to form the strand, the probe, the globule, etc. Such a process would require very precise mechanical jigs and would be time consuming and economically inefficient.

A highly efficient method for manufacturing the temperature sensing unit which makes the disposal of these units after each use economically feasible has been developed. According to this facet of the invention, the strand and probe are unitarily formed by extruding a thermoplastic material, which is electrically insulating and nontoxic, onto the conductors 22 and 24. This forms a thermoplastic, electrically insulating sheath about the conductors and spaces the conductors in the insulated sheath so as to be insulated from each other.

The extrusion process is intermittant and of variable speed to provide the unitarily formed strand, probe and globule. The conductors move through the extruding die at a relatively rapid rate during the formation of the strand 12 but the rate of movement of the conductors, relative to the die, is slowed at the transition area between the strand 12 and the enlarged probe 14. The conductors are also spaced further apart at this point. While the rate of material extrusion remains substantially the same, the rate of passage of the conductors through the die is at a relatively lower rate during the formation of the probe. This results in a structure which has a relatively greater rigidity than the strand rigidity because of the substantially larger probe cross sectional area which results from the extrusion of a greater quantity of thermoplastic insulating material for each linear increment of conductor.

As a predetermined length of probe is formed, the rate of passage of the conductors through the extruding die again increases, which results again in a strand. At this point, however, an auxiliary die closely surrounds the conductors 22 and 24. The extrusion continues and the material which is extruded forms a globule at the free end of the strand. The resulting structure is a unitarily formed probe, strand and globule through which the conductors 22 and 24 extend from end to end. The bare conductors extend a short distance from the free end of the probe to the beginning of the globule. These strand and probe members are repeatedly formed on the conductors. These conductors are then cut intermediate the strand and globule thus providing bare conductors at each end of the unitary strand and the probe structure for connecting the plug and temperature sensitive element, without the necessity for stripping.

If desired, the strand may be so formed and constructed during extrusion as to normally assume a coiled configuration, as illustrated in FIG. 1. This may be accomplished, for example, by running the freshly extruded strand over a curved heated mandrel such that one side of the strand is more rapidly cooled and hardened than the other. Other techniques for forming permanently coiled extruded strands are also known in the art.

Figure 3:
FIG. 3 is a lateral section of the strand portion of the temperature sensing unit taken substantial along lines 3—3 of FIG. 2.
Figure 4:
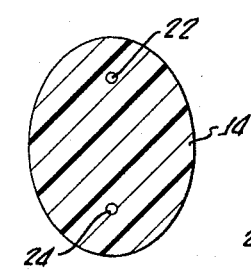
FIG. 4 is a lateral section of the probe portion of the temperature sensing unit taken substantially along lines 4—4 of FIG. 2, FIGS. 3 and 4 generally illustrating the relative sizes of the strand and the probe portions.
Figure 5:
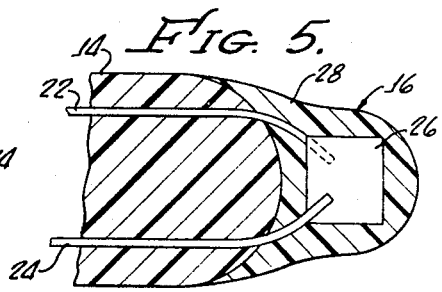
FIG. 5 is a partial longitudinal section of the end of the probe showing the connection of the conductors to the thermistor temperature sensitive element.

As FIGS. 3 and 4 illustrate, the strand and probe are oval shaped in cross section. This configuration permits maximum spacing and insulation between the conductors, more convenient formation of a permanently coiled configuration of the strand, and maximum efficiency in the utilization of materials. This configuration is also convenient in finishing the temperature sensing unit by the connection of the plug and temperature sensitive element.

Desirably, the bare conductors at the respective ends of the unitary strand and probe member are pre-tinned. The temperature sensitive element, a thermistor for example, is then placed between the tinned conductors proximate the end of the probe and the conductors are soldered thereto by the application of heat. Heat may be applied directly as by a soldering iron but is more conveniently applied as radiant heat from a quartz lamp, for example.

The process for completing the temperature sensitive unit and for forming the plug 18 on the strand 12 or any cable of like construction is surprisingly efficient. The laminated board, with the foils on either side, is placed between the pre-tinned conductors. The conductors are pressed to the board and heat is applied, directly or by radiation from a quartz lamp, as previously described. This melts the solder on the foils and on the wire and forms a sound electrical connection. This also heats the globule of thermoplastic material adjacent the end of the laminated board. The heated semi-fluid insulating material is then thermoplastically deformed to flow over the end of the laminated board and into the aperture 42 to form a globule which partially encompasses the laminated board, as illustrated best in FIGS. 6 and 7. This forms a strong mechanical connection between the strand and the plug. Other means, such as indentations, for receiving the thermoplastic material may likewise be provided. The thermoplastic deformation may be accomplished by running rollers over the globule from the strand in the direction of the laminated board, by pressing the globule between jaws or dies, or in any other convenient manner to provide the desired globule shape. The use of the aperture is not essential to the formation of the plug but provides a substantially greater mechanical strength in the connection between the laminated board and the strand.

While the process for making the temperature sensing unit and the process for forming the plug have been described as discreet steps, in commercial practice the unitary strand-probe-globule member is extruded in one operation, these units being extruded on the conductors in extremely rapid succession. The strand-probe-globule member is then moved to a specially formed jig which in two parallel simultaneous operations solders the temperature sensitive element, the thermistor, for example, to the conductors adjacent the probe, solders the conductors to the laminated board and completes the plug by forming the globule over the end of the laminated board to provide mechanical connection to the strand.

The temperature sensing unit is then completed by coating the temperature sensitive element and bonding this element to the probe with a thin layer of electrically insulating heat conductive material. This may be done by dipping the temperature sensitive element and the tip of the probe in a thermosetting or thermoplastic material, by painting a settable or hardenable resin or paint over the tip of the probe and the element, by casting a thin layer over the element and the tip of the probe, or by other suitable means. Dipping of the tip of the probe including the temperature sensitive thermistor has been used satisfactorily but other techniques may be used with equal or perhaps greater advantage in certain circumstances.

Actually, the coating for the temperature sensitive element need not be highly thermally conductive, since the coating film thickness over the thermistor is so thin, but the material should not be an extremely good insulator.

A variety of materials may be used for forming the temperature sensing unit. For example, virtually any extrudable thermoplastic material may be used in the process described for unitarily forming the strand and probe. Those thermoplastics which are most easily and conveniently extruded, and which are nontoxic, are preferred. Polyethylene and polypropylene, for example, are ideally suited to the formation of temperature sensing units according to the process described. The coating which covers and insulates the temperature sensitive element and bonds it to the tip of the probe may likewise be formed of a great variety of resins, which may include fillers, pigments, etc. Silicone resins and epoxy resins, for example, may be used. Epoxy resins have been found quite satisfactory for the production of the temperature sensing unit described. Thermoplastic materials such as, for example, polyethylene, the vinyl resins, the acrylic resins, etc. may also be used.

In the preceding discussion, the process for forming the plug has assumed the availability of the thin flat board 30 with the foils 32 and 34 laminated on each side. Actually, the board may be formed as preliminary steps in the construction of the plug. Laminated boards of this type are easily formed simply by adhesively securing a foil to the surface of the board. The board may be of other configurations and may be referred to more generally as elongated insulating pins. In the sense of this invention, the terms "laminated" and "foil" are used very broadly to describe the type of structure formed and do not necessarily refer to the steps in the formation of this structure. The step of laminating may, for example, comprise the equivalent steps of liquid or vapor deposition of a metal film on the board, etc. and the term "foil" simply refers to a metal element which is relatively thin. The metal coating on the insulated board is, for purposes of this invention, described as a foil even though the coating may have resulted from liquid or vapor deposition, etc. Maximum efficiency results from forming a large laminated board and by cutting the board to the desired size.

The temperature sensing unit 10 of this invention is subject to a great variety of applications which provide very substantial technical and economic advantages over the conventional glass clinical thermometer and of prior thermoelectric thermometers. For example, continuous monitoring of a patient's temperature is easily accomplished using the temperature sensing unit in combination with appropriate recording or indicating equipment. Central monitoring of the temperatures of a large number of patients is also easily accomplished by providing appropriate circuitry for connecting several temperature sensing units into suitable recording or indicating equipment at, for example, a nurses' station. The sensing unit is, at the same time, inexpensive enough to be disposable and accurate, as well as being rugged and reliable.

Typically, however, the advantages of the temperature sensing unit of the invention result from the combination of the temperature sensing unit with a temperature indicating unit which may be of the type illustrated in FIG. 1 at 20. Typical circuitry for an indicating unit is illustrated schematically in FIG. 8. The circuitry constitutes means for generating a signal in response to a temperature related electrical characteristic of the temperature sensitive element. If the temperature sensitive element is a thermocouple for example, then the circuitry may simply constitute a reference thermocouple associated with necessary shunts, multipliers, etc. In the illustrated example, however, where the temperature sensitive element is a thermistor contained in the probe, the signal generating circuitry is a Wheatstone bridge which may be generally of the type illustrated in FIG. 8. The source of electricity in the circuit illustrated in FIG. 8 is a battery 60 with resistors 62, 64 and 66 forming three legs of the bridge. The fourth leg of the bridge includes a switch 68 and a standard or reference resistor 70. When the switch 68 is closed to connect reference resistor 70 into the circuit, the meter 72 will give a predetermined temperature or test indication to determine that the circuitry is operating properly and to test the battery voltage. When the switch 68, which is normally open, is closed in the other direction to remove reference resistor 70 from the circuit and place the probe thermistor into the circuit as the fourth leg of the Wheatstone bridge, then the circuitry produces a signal, resulting from the degree of imbalance in the Wheatstone bridge, which is a function of the electrical resistance of the thermistor and, consequently, of the temperature of the thermistor. This signal is applied to the meter 72 which gives a temperature indication in response to this signal. A trimmer resistor 74 may be included in the meter circuit and an on-off switch 76 may be included in the meter circuit and an on-off switch 76 may be included in the battery circuit if desired. The on-off switch 76 and selector switch 68 may conveniently be gauged.

In an exemplary embodiment of the invention, resistors 62 and 64 are precision 5K resistors, resistor 66 is a 1990 ohm precision resistor and reference resistor 70 is a 1456 ohm precision resistor. A 4.63 volt mercury battery pack powers the circuit and a 1500 ohm trimmer resistor 74 compensates for meter resistance variance. The meter has a sensitivity of approximately 3.3 microamps per degree Fahrenheit on the scale. The meter scale is conveniently calibrated from about 94° F to about 108° F. The thermistor has a resistance of 1456 ohms at 106°F and 1990 ohms at 94° F.

Obviously, Wheatstone bridge circuits and other signal generating circuits can be designed using conventional electrical engineering principles to provide the desired visual indication for use with suitable thermistors.

The temperature sensing unit of the invention, as described, and the plug which forms a part of the temperature sensing unit can be produced on a mass production basis using fully automated techniques at costs low enough to permit the single use and disposition of the sensing units. Sensing units of the prior art which have utilized thermistors or other thermoelectric sensing elements have been so complex and expensive as to prevent their substitution for the conventional glass clinical thermometer. The temperature sensing unit of this invention, therefore, produces a new and useful result, not possible using prior art devices, in that the transmission of disease from one patient to another is completely avoided while, at the same time, obtaining the accuracy, economy, and convenience which can result from the use of thermoelectric temperature sensing elements.

The plug construction and process of manufacture have been found most suited to the production of temperature sensing units of the type described, but these plugs may also be used in other applications and in other structures in which a highly reliable and economical connection is required. The shape and configuration of the plug may, of course, be varied to fit specific requirements imposed by any particular application.

The advantages in the method of manufacture of the temperature sensing unit in terms of efficiency, economy, and technical reliability are evident from the discussion and the illustrations hereinbefore. Variations in this method, in the method of manufacture of the plug, and in the structures described and illustrated may be made within the skill of the art and based upon the teachings herein without departing from the spirit and scope of the claims which follow.

We claim:

1. An electric fever thermometer comprising the combination of:

a disposable temperature sensing unit which includes a continuous flexible strand and relatively more rigid probe element, said strand and probe element being an extruded, single, unitary length of nontoxic sterilizable material, a temperature sensitive element mounted proximate the free end of the probe, and conductors extending from the temperature sensitive element through and being integrally bonded in spaced relation in the probe and strand, the relatively greater rigidity of the probe resulting from a substantially larger probe cross sectional area than the cross sectional area of the strand;

a temperature indicating unit which includes means for generating a signal in response to a temperature related electrical characteristic of the temperature sensitive element, and means responsive to said signal for visually indicating the temperature of the temperature sensitive element; and means for electrically connecting the conductors at the free end of the temperature sensitive unit strand to the signal generating means in the temperature indicating unit.

2. An electric fever thermometer of the type described in claim 1 wherein the temperature sensitive member includes a thin, heat conductive, electrically insulating coating, the probe and the temperature sensitive member being arranged and constructed such that the temperature sensitive element coating can be in direct contact with the body tissue of a patient during use to give a rapid and precise visual indication of the patient's temperature.

3. The electric fever thermometer as described in claim 1 wherein the strand and probe are unitarily formed of extruded thermoplastic polymeric material.

4. An electric fever thermometer of the type described in claim 1 wherein the temperature sensitive element is a thermistor coated with a thin, electrically insulating, heat conductive material adapted to lie in intimate contact with a patient's tissue during use for permitting rapid and accurate measurement of the tissue temperature and for electrically insulating and sealing the thermistor to the free end of the probe, the probe and strand being unitarily formed of extruded thermoplastic material, the relatively greater rigidity of the probe resulting from a substantially greater probe cross sectional area than the cross sectional area of the strand, the temperature sensitive unit being so formed and constructed as to be economically disposable after a single use.

5. The electric fever thermometer described in claim 4 wherein the connecting means comprises:
an electrical receptacle in the temperature indicating unit and an electrical plug adapted to be received in said receptacle attached to the free end of the strand of the temperature sensing unit, said plug consisting essentially of a single, thin, flat, rectangular insulating board, a foil secured on each side of the board, means securing the conductors respectively to the conductive foils, and means thermoplastically formed from the strand material securing the insulating board and foils to the strand.

6. An electric fever thermometer of the type described in claim 1 wherein the connecting means consists essentially of an electrical receptacle in the temperature indicating unit and an electrical plug adapted to be received in said receptacle attached to the free end of the strand of the temperature sensing unit, said plug consisting essentially of a single, thin, flat, rectangular insulating board, an electrically conductive foil laminated on each side of the insulating board, means securing the conductors respectively to the conductive foils, and means thermoplastically formed from the strand material securing the insulating board and laminated foils to the strand.

7. An electric fever thermometer comprising the combination of:
an inexpensive disposable temperature sensing unit made up of an extruded unitary strand and probe element composed of flexible, nontoxic sterilizable thermoplastic polymeric material having a pair of electrical conductors extending from end to end thereof with the probe having a substantially larger cross sectional area than the cross sectional area of the strand to give the probe relatively greater rigidity than the strand, a high precision, high sensitivity thermistor connected to the conductors at the free end of the probe and a coating of electrically insulating, heat conductive material thinly covering the thermistor and bonding the thermistor to the end of the probe, and an electrical plug secured to the free end of the strand, said plug consisting essentially of a thin, flat insulating board, a conductive foil laminated on each side of the insulating board, means securing the conductors respectively to the foils, and a globule formed from the strand material by thermoplastic deformation securing the strand to the laminated board; and
a temperature indicating unit including an electrical receptacle for the temperature sensing unit plug, means electrically connected to the receptacle for generating a signal in response to the electrical resistance of the thermistor, and a meter responsive to said signal for visually indicating the temperature of the thermistor; said temperature sensing unit being so constructed and formed as to be economically disposable after a single use, the coating on the thermistor being sufficiently thin and the probe being so designed as to permit the thermistor coating to rest in intimate contact with the tissue of a patient during use for giving a rapid and precise visual indication of the patient's temperature.

8. The electric fever thermometer as described in claim 7 wherein the strand is so formed and constructed as normally to assume a coiled configuration.

9. The electrical fever thermometer as described in claim 8 wherein the probe is ovally shaped in cross section.

10. A disposable temperature sensing unit for use with a temperature indicating unit as an electric fever thermometer comprising:
an extruded, single, unitary strand and probe element composed of flexible, nontoxic, sterilizable material and including integrally bonded conductors in spaced relation in said material extending from end to end therethrough, the strand being easily flexible with the probe having a substantially larger probe cross sectional area than the cross section area of the strand to give the probe relatively greater rigidity;
an electrical plug secured to the free end of the strand and connected to the conductors therein; and
a temperature sensitive element secured to the conductors and to the free end of the probe.

11. A temperature sensing unit of the type described in claim 10 further comprising;
a heat conductive, electrically insulating coating thinly covering the temperature sensitive element and bonding the temperature sensitive element to the end of the probe.

12. The temperature sensing unit as described in claim 10 wherein the electrical plug comprises:
a thin flat insulating board;
conductive foils on the sides of the insulating board;
means securing the conductors respectively to the foils; and
a globule of thermoplastically formed strand material securing the laminated board to the strand.

13. The temperature sensing unit as described in claim 12 wherein the laminated board has an aperture into which the strand material extends for forming a strong mechanical connection with the strand.

14. A disposable temperature sensing unit comprising:

an extruded unitary nontoxic sterilizable thermoplastic strand and probe element which includes a pair of conductors extending from end to end therethrough, the probe portion of the element having a substantially larger cross sectional area than the cross sectional area of the strand thereby giving the probe relatively greater rigidity;

a thermistor connected to the conductors at the free end of the probe;

an electrically insulating, thermally conductive coating thinly covering the thermistor and bonding the thermistor to the end of the probe; and a plug secured to the free end of the strand, said plug consisting essentially of a flat insulating board, a conductive foil laminated to each side of the board, means connecting the conductors respectively to the foils, and a globule of thermoplastically deformed strand material securing the strand to the board;

the coating on the thermistor being sufficiently thin and the probe and thermistor combination being so constructed and formed as to permit the thermistor to lie in intimate contact with the tissue of a patient during use to permit rapid and accurate temperature measurement when the temperature sensing unit is used in association with a temperature indicating unit.

15. The disposable temperature sensing unit as described in claim 14 wherein the strand is so formed as to assume a normally coiled configuration.

16. A disposable temperature sensing unit for use with a temperature indicating unit as an electric fever thermometer, consisting essentially of:

an extruded, single, unitary probe element composed of thermoplastic, insulating, flexible, nontoxic, sterilizable material and including integrally bonded conductors in spaced relation in said material extending from end to end therethrough the strand being easily flexible, the probe being relatively more rigid than the strand by reason of a greater cross sectional probe area than the cross sectional area of the strand;

a thermistor secured to the conductors at one end of the probe;

a heat conductive, electrically insulating coating thinly covering the thermistor and bonding the thermistor to the end of the probe; and means for connecting the probe to the indicating unit including a thin flat insulating board, conductive foils on the sides of the insulating board, means securing the conductors extending from the other end of the probe respectively to the foils, and a globule of said thermoplastic material securing the laminated board to and insulating the conductors.

17. The disposable sensing unit as described in claim 16 wherein the insulating board includes an aperture into which said thermoplastic material extends.

* * * * *